(12) United States Patent
Maioriello et al.

(10) Patent No.: US 6,417,171 B1
(45) Date of Patent: Jul. 9, 2002

(54) PREPARATION OF POLYMERS BY INTERFACIAL DERIVATIZATION

(75) Inventors: James Maioriello, Huntington; Jairo Rene Martinez, Sound beach; James A. Hayward, Stony Brook, all of NY (US)

(73) Assignee: Collaborative Laboratories, Inc., East Setauket, NY (US)

( * ) Notice: Subject to any disclaimer, the term of this patent is extended or adjusted under 35 U.S.C. 154(b) by 0 days.

(21) Appl. No.: 09/211,931

(22) Filed: Dec. 15, 1998

Related U.S. Application Data

(62) Division of application No. 08/787,686, filed on Jan. 23, 1997, now abandoned.
(51) Int. Cl.$^7$ ............................................. A01N 43/04
(52) U.S. Cl. ........................... 514/53; 514/54; 536/17.2; 536/18.7; 536/55; 536/55.1; 536/55.3; 536/106; 536/123.1
(58) Field of Search ...................... 514/53, 54; 536/106, 536/123.1, 17.2, 18.7, 55, 55.1, 55.3

(56) References Cited

U.S. PATENT DOCUMENTS

| | | |
|---|---|---|
| 4,251,387 A | 2/1981 | Lim et al. |
| 4,533,254 A | 8/1985 | Cook et al. |
| 4,908,154 A | 3/1990 | Cook et al. |
| 5,437,867 A | 8/1995 | Vichroski et al. |
| 5,616,568 A * | 4/1997 | Pouyani et al. ............... 514/54 |

* cited by examiner

*Primary Examiner*—Bernard Lipman
(74) *Attorney, Agent, or Firm*—Darby & Darby

(57) ABSTRACT

This invention utilizes methods of emulsion chemistry to derivative polymers, as distinguished from the synthetic methods of the prior art, whereby such polymers are derivative in a true solution. The derivative polymers are useful in that they may be readily reacted with small polymers or other molecules to form new polymeric entities. The new polymeric entities may be further derivative during the step of interracial dramatization, or may be provided for reaction to the product in a subsequent step to form the target product.

15 Claims, 2 Drawing Sheets

PREPARATION OF POLYMERS BY INTERFACIAL DERIVATIZATION

This is a division of application Ser. No. 08/787,686, filed Jan. 23, 1997, now abandoned. This prior application is hereby incorporated herein by reference, in its entirety.

The present invention relates to dramatization, and, more particularly relates to a process for reacting a water soluble polymer with a water insoluble derivation agent and product by same.

BACKGROUND

Terms such as suspension polymerization and interracial polymerization are known to be used to describe processes by which polymers are synthesized by cross-linking of their mongers utilizing a polymerizing agent. Polymerization is known to occur within such processes heterogeneously, where the mongers, which are usually water insoluble, form tiny droplets which act as a reservoir of react ants. In some instances, surfactants may be added to facilitate droplet formation and stabilization.

The polymerization initiator or polymerizing agent may be either water soluble or water insoluble. In the case where the polymerization initiator is water-insoluble, polymerization occurs within the monomer droplet to form latex's (suspension polymerization). When water soluble polymerization initiators are employed, polymerization occurs within micelles formed from the added surfactants (emulsion polymerization). Interracial polymerization describes a process whereby polymers are formed at the interface of two immiscible liquids, each containing a reacting monomer in solution. Each of the mentioned processes, suspension, emulsion and interracial polymerization, are polymerization processes wherein the polymer is prepared at the interface of immiscible liquids.

Dramatization is a term used to describe a process whereby functional groups pendant to a polymer chain are chemically modified or reacted in some way to change some character of the polymer. Typically, this is facilitated in solvents which are capable of dissolving the polymer and the derivation agent. Solvents are necessary because such reactions do not occur unless the reacting species (i.e., the polymer and derivation agent) can be brought into intimate contact. For that matter, a common or miscible solvent is almost always used in prior art polymer dramatization processes. Alternatively, phase transfer catalysts may be utilized to react polymers and derivation agents in certain instances, but the phase transfer catalysts are costly and of limited general utility.

Those skilled in the art are continuously looking to uncover or create new polymers, particularly in the fields of biochemistry. For that matter, great interest has recently been shown in a biopolymer known as hyaluronic acid (HA) for its usefulness in a variety of personal and health care products. Hyaluronic acid is a member of a broad class of naturally occurring polyanionic carbohydrates collectively known as glycosaminoglycans (GAGs). Hyaluronic acid consists of repeating units of the of N-acetyl-D-glucosamine and D-glucuronic acid (its primary structure), joined by a β1–4 glucosaminic bond (FIG. 1). The molecular weight reported for hyaluronic acid varies between 50,000 to 80,000,000 Daltons depending on the source, method of isolating and method of size determination.

Hyaluronic acid is also a biomolecule which is naturally present in connective tissue, synovial fluid, adult human skin, etc., HA functions as a biomolecule to impart structure and rigidity to the tissue or biomaterials within which it is present. Accordingly, HA is biocompatible such that HA and HA derivatives introduced systemically are normally well accepted by the human body. Hyaluronic acid is also believed to regulate cell morphology and to protect organisms from bacterial and/or other external factors. This protective action is believed related to HA's high viscosity and water solubility. HA's high viscosity is attributed to the extensive hydrogen bonded network present in its carboxylate form, which also facilitates the formation of highly viscous HA gels, or hydrogels.

Many novel HA-based products are known and available in the marketplace which utilize HA's unique biocompatibility. For example, Biocare Polymer HA-24, Biocare AS, Visible Youth, Hylaform, Healon, Synvisc, Seprfilm, and Sepragel, are merely several known HA-containing products available in the US and world markets. Such products have a broad range of applications such as opthalmics, wound repair, surgical aids, cosmetic moisturizers, etc., as well as the development of bioerodable scaffolding for tissue engineering, and regeneration.

HA, therefore, is an extremely important molecule (i.e., biopolymer), applications for which may be improved by its dramatization. For example, attachment to HA of a compatible molecule could further enhance the biofunction facilitated by the HA-based product, or provide for a function in addition to that provided by the HA. Hence, it would be desirable to develop a process for derivation polymeric moieties, such as HA, in a safe and efficacious manner to realize desired polymeric entities with improved functional properties.

SUMMARY OF THE INVENTION

In this invention, we describe a process whereby polymers present within a solution may be derivative by a derivation agent therein which is ordinarily insoluble in the solvent. Preferably, the solvent is water and the polymer is water soluble. The water and the water soluble polymer are mixed with the water-insoluble derivation agent, and the mixture is emulsified using a Polytron™ homogenizer. The homogenizer action renders the water insoluble derivation agent within the mixture into the form of tiny droplets, typically less than 1 micron in diameter. To facilitate emulsification, the derivation agent is preferably a liquid, or, in some instances, a highly concentrated solution in a suitable water-insoluble solvent. The polymer is compelled to undergo dramatization at the interface between the aqueous phase and the emulsified derivation agent. Hence, the process is referred to as interracial dramatization.

The process of the present invention is useful for several reasons. First, by utilizing the process described herein, it is possible to react a polymer with an agent where the react ants normally do not react because their wide differences in solubilities prevent the intimate contact necessary for reaction. The second reason is that the process is an alternative process to the more costly emulsion polymerization processes known in the art. The (cost of the additives needed for emulsion polymerization excessively increases the cost of the process since it may be necessary to remove the additive in a subsequent process. Finally, the use of additives while facilitating the chemistry, may alter the resulting product in some deleterious way. For example, surfactants can act as placticizers to a polymer altering the polymer's physical properties.

Accordingly, a preferred embodiment of the enabling technology is presented herein in the form of a dramatization process utilizing hyaluronic acid (HA), a water soluble biopolymer. It should be noted, however, that while specifically describing HA dramatization, the invention is not limited to the interracial dramatization of HA, or any other water-soluble polymer. The interracial dramatization process defined herein is applicable to any water-soluble polymer containing carboxyl and/or hydroxyl groups, or more generally, other water-soluble polymers containing nucleophilic groups. Accordingly, the scope of the invention should be limited only by the claims appended hereto.

DETAILED DESCRIPTION OF THE INVENTION

Figure 1:
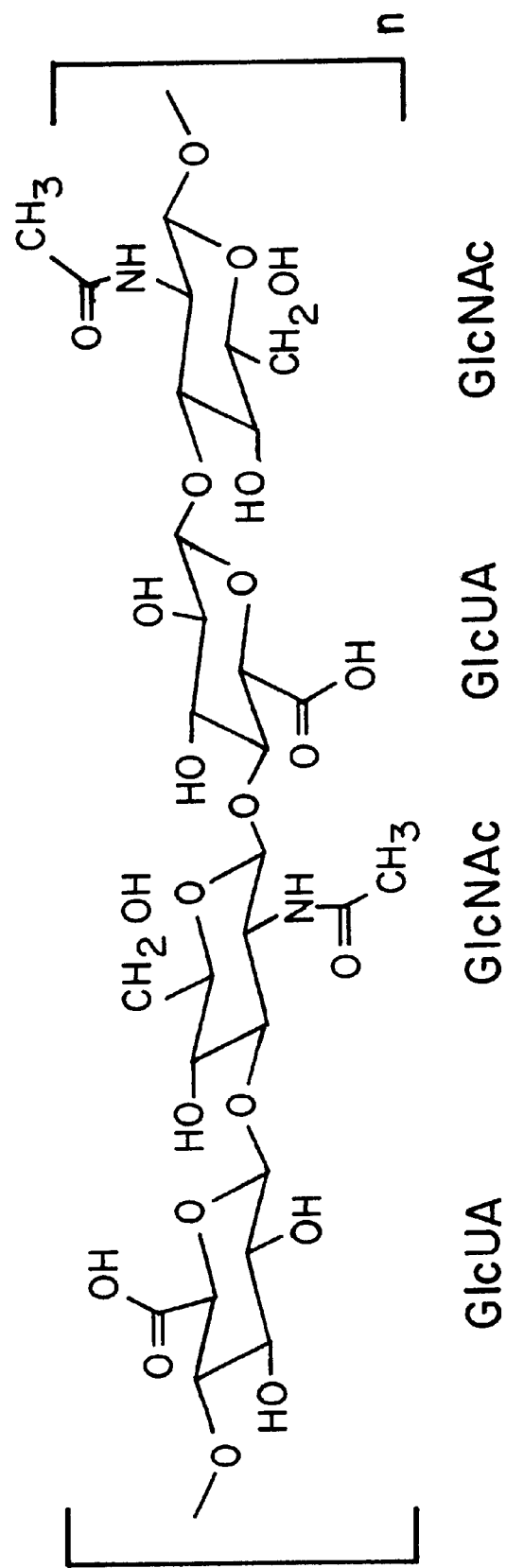
FIG. 1 is a schematic representation of hyaluronic acid.

The present invention discloses a process for derivation HA to varying degrees for applications within the pharmaceutical, health and personal care industries. The process recited is referred to as interracial dramatization. Within the interracial dramatization process, a water-insoluble chemical moiety or derivation agent is attached to a water-soluble polymer. The conjugation of the moiety to the polymer occurs at or near the interface of the two phases, formed as a mixture for reaction. That is, between the aqueous phase comprising the polymer and the water-insoluble phase comprising the water-insoluble derivation agent. The aqueous phase may include a water-soluble derivation agent whereby an activating agent which essentially readies the water-soluble polymer for dramatization is contained in the non-aqueous phase. Therefore, during the homogenizing mixing, the water-soluble polymer and water-soluble derivation agent are brought into contact at the interface of the aqueous phase to that of a non-aqueous phase containing the water-insoluble activating agent. Alternatively, the activating agent may be contained in the aqueous phase and the derivation agent may be in the non-aqueous phase.

For example, a process of the invention utilizes dicyclohexyl carbodiimide (DCC) as an activating agent in a non-aqueous phase. The water-soluble polymer and the derivation agent are maintained in an aqueous phase. DCC is a water insoluble carbodiimide, which are known to react with carboxylate groups to form "activated carboxylates" [Recent Developments in the Carbodiimide Chemistry, Marian Mikolojczky, and Piotr Kielbasinski, in Tetrahedron, 1981, 37, 233–284]. DCC is commonly used to activate carboxylate groups of a polymer for dramatization of same to form new polymer entities. That is, the carboxylate group is activated and then reacted with a derivation agent or other portion of the polymer. Without activation, the polymer would not be capable of reaction (i.e., conjugation with the added derivation agent) since both the polymer and the derivation agent are of the same electronic functional group class (i.e., nucleophiles). Hence, the necessity to "activate" the functional group at the interface between the phases to facilitate the dramatization reaction.

While water soluble carbodiimides do exist and can be used to activate carboxylate-containing water soluble polymers in the presence of a water soluble derivation agent, they are very expensive and cost prohibitive in some applications. Accordingly, the present invention utilizes DCC as a water-insoluble activating agent which is significantly less expensive than prior art agents which could be used to derivative the same polymers. While the examples cited herein apply to the dramatization of hyaluronic acid, a water soluble polymer containing carboxylate and hydroxyl groups, the technology could be used to make derivatives of other polymers which contain carboxylate and hydroxyl groups using the less costly and readily available DCC as the carbodiimide.

However, the invention also supports process whereby both the water-soluble polymer and the activating agent are in the same aqueous phase, and the water-insoluble derivation agent is in non-aqueous phase. In such a case, 1-(3-dimethylaminopropyl)-3-ethylcarbodiimide hydrochloride (EDC) is utilized within the aqueous phase as the activating agent. Hence, cost is not an issue but the process is amenable to dramatization of a water-soluble polymer with a water insoluble derivation agent, such as palmitic hydrazide.

In a preferred embodiment, the process of this invention includes forming a reaction mixture as an emulsion using a homogenizer. Essentially, a water-soluble polymer and water-soluble derivation agent are first dissolved in aqueous solution. The water-insoluble activating agent is added for emulsification into the mixture by the homogenizer. The water soluble polymer and derivation agent are mixed while the mixture is maintained as a dispersion within a proper range of pH. When the dispersion's pH is observed to be stable, a non-aqueous phase containing the activating agent is added to same. The mechanical action of the homogenizer creates contact at the interface between the phases.

Alternatively, the activating agent may be water soluble and therefore maintained in the same aqueous phase with the water-soluble polymer to be derivative, whereby the derivation agent is maintained in non-aqueous phase. EDC is appropriate under such circumstances. It follows that the water-soluble polymer is activated by the EDC within the polymer/EDC dispersion. The activated polymer is derivative in a subsequent step emulsifying the aqueous phase with the derivation agent. The activated polymer can be isolated in pure form by removing from it unwanted byproducts, such as unreacted carbodiimide, and then lyophilizing the resulting purified polymer before mixing it with the non-aqueous phase which includes the derivation agent. Because the actual derivitization occurs at the interface between two phases, we define or characterize the process of this invention as interracial dramatization. That is, interracial derivitization is a process by which a polymer is derivative at the interface between a bulk aqueous phase and an oil-soluble phase. The aqueous phase may include the derivation agent where the activating agent is maintained in the water-insoluble phase. Alternatively, the aqueous phase may contain the activating agent whereby the derivation agent is maintained in non-aqueous phase.

Through emulsification, the effective surface area of the insoluble derivation agent is increased to a point where the reaction rate is convenient for development of commercially viable processes. For that matter, while the process is described with particular reference to HA, it can be utilized to derivative a wide range of soluble polymers with insoluble agents provided the chemistry is correct. A Polytron® mixer, as mentioned above, is a preferred homogenizer. Polytrons are generally used to disrupt plant and animal tissues for the purpose of obtaining their intracellular components. Polytrons are also used to prepare emulsions by imparting energy to mixtures of water and oil to render the oil in a form of tiny droplets (less than 1 micron in diameter as an emulsion). Other types of homogenizers can be used by the process described herein without diverging from the invention's intended scope. For example, a Silverson Mixer has been used to emulsify oil into water.

The following example describes the process for preparing an adipic dihydrazide derivative HA polymer. All reagents and chemicals used in this or following examples are available from commercial suppliers, except HA-QUAT, which is prepared in applicant's laboratories by reacting HA with N-(3-chloro-2-hydroxypropyl) trimethylammonium chloride.

EXAMPLE 1

Approximately 10.0 g of hyaluronic acid (manufactured and supplied by ARD, France, MW 0.7 MD) were dissolved in 2.00 L $H_2O$ in a 4-L beaker. The solution was heated slowly to 43° C. while stirring with a Silverson L4R mixer at 5000 rpm. Afterwards, approximately 10.6 g of adipic dihydrazide (ADH) were added and the mixture was stirred until it was observed to be homogeneous. Adipic dihydrazide is capable of reacting with polymers containing carboxylate groups which have been activated using carbodiimides. The result is a hydrazide of the polymer. The HA's carboxylate group is activated with the carbodiimide to form an O-acyl urea derivative ("activated carboxylate group"), which is then caused by the emulsification to react at the interface of the phase containing the adipic dihydrazide to form the resulting polymer hydrazide in the same process.

The carboxylate group is activated with the carbodiimide to form an O-acyl urea derivative ("activated carboxylate group"). The pH of this aqueous phase is then lowered to within a range of from about 4.2 to about 4.85 by the addition of 1 N HCl. When the pH of the reaction mixture has been adjusted, approximately 1.3 g of molten dicyclohexyl carbodiimide were added to the dispersion while operating the mixer's speed at between 3500 and 3600 rpm to maintain the mixture in an emulsified state. The phase containing the molten DCC interacts at the interface with the ADH and HA to activate the HA for dramatization by HA. The pH was maintained between 4.2 and 4.85 by addition of 1 N HCl while stirring continuously as described. The pH of the reaction mixture containing the ADH-derivative HA was observed to be constant for approximately 20 minutes after approximately 1.75 hours stirring and adjusting, and then neutralized by the addition of 6 N NaOH.

The neutralized ADH derivative HA mixture was allowed to cool to room temperature and purified by continuously circulating it for two days through a Minitan® system, manufactured by Millipore Corporation of Massachusetts, at 10 psi, using a 300,000 MWCO polysulfone membrane. Purification removed lower molecular weight starting material and reactivity byproducts. The purified retentate was freeze-dried to afford solid HA-ADH or hyaluronic acid derivative with adipic dihydrazide. Results from elemental analysis of the freeze dried product were as follows: 40.66% C, 6.48% H, 4.51% N. Using the calculated dependence of the % N on degree of substitution, these elemental analysis results indicate a molar degree of substitution (or dramatization) to be 17%.

Figure 2:
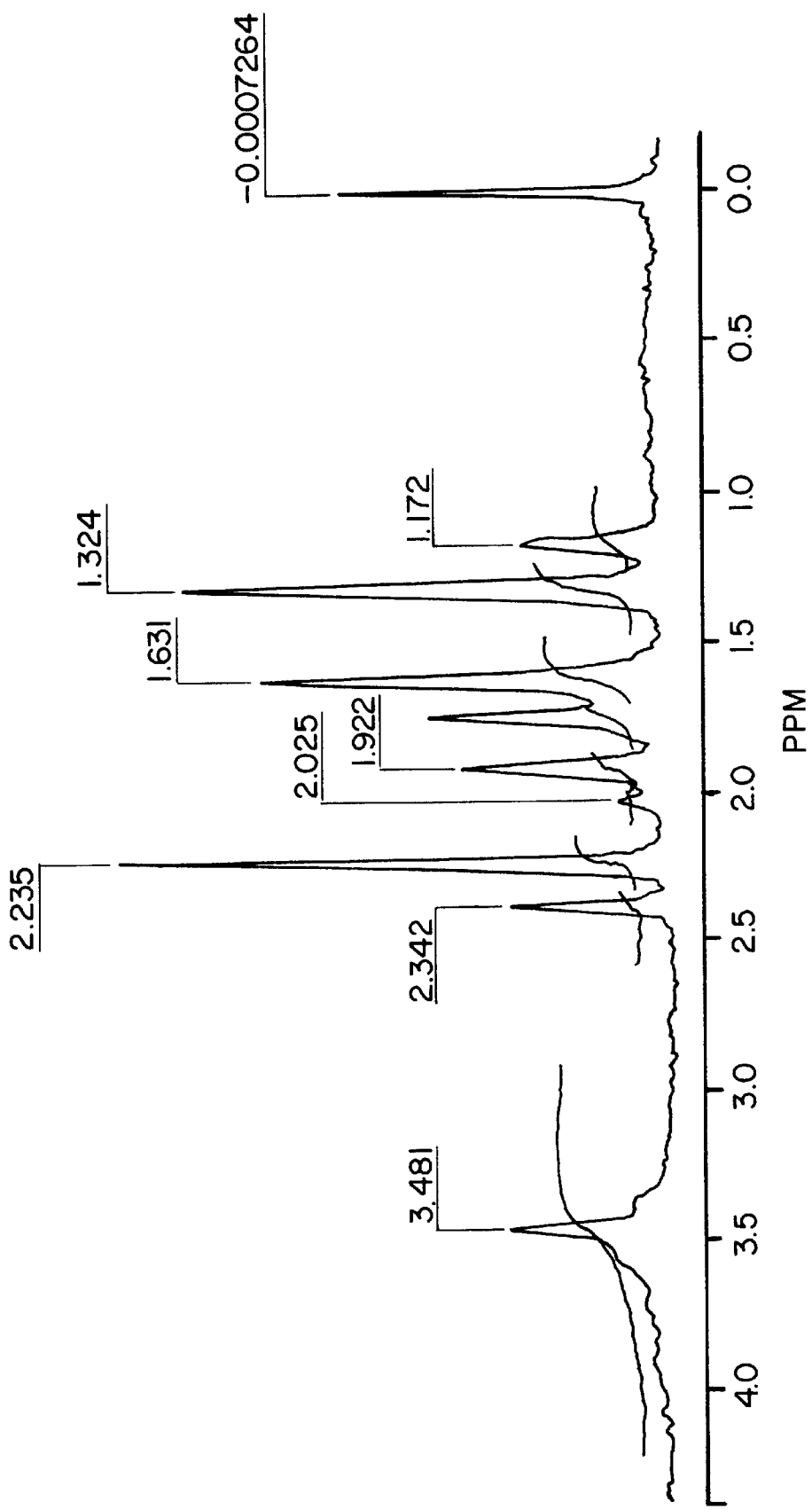
FIG. 2 is a schematic representation of the results of a proton NMR spectroscopy of adipic dihydrazide derivative of hyaluronic acid prepared in accordance with the process of this invention.

The proton NMR of the lyophilized HA/ADH powder in water is displayed in FIG. 2. The proton spectrum displays a peak at between 1.6 and 2.3 ppm. The peak is assigned to the methylene protons in the adipic side chain. It should be noted that the magnetic environments are not completely averaged by motion as in the case of the free adipic dihydrazide. The methylene group next to the hydrazide linked to the HA gives rise to a peak at 2.38 ppm. The methylene group next to the free hydrazide end of adipic dihydrazide produces a peak at 2.25 ppm. The intermediate methylene groups are responsible for the remaining peaks between 1.6 and 2.1 ppm. The peaks at 3.4, 1.32 and 1.17 ppm are assigned to the N-acyl urea adduct of HA and DCC. The N-acyl urea adduct is present due to the known rearrangement of the O-acyl urea (i.e., the activated carboxylate moiety of the polymer) to the unreactive N-acyl urea form.

Evidence of DCC is found because DCC is not water soluble and therefore not removed via the purification process. However, the DCC evidenced is not free DCC. Rather, it is DCC reacted with HA but not displaced by the adipic dihydrazide. This does not depend on the solubility of DCC. It happens as well with EDC, which is water-soluble. N-acyl urea is typically a side product of the process, the resulting amount of which can be controlled by varying the proportions of HA, DCC and ADH.

The following example describes the process for preparing a palmitic hydrazide HA polymer. In this example, the derivation agent, palmitic hydrazide, is water insoluble, and the polymer activating agent is EDC, a water-soluble carbodiimide.

EXAMPLE 2

The first step includes placing approximately 2 L of a 0.6% hyaluronic acid (distributed by Optima Chemicals, Ltd., England) solution in a 4-L beaker and heating the HA solution to approximately 60° C. At the stated temperature, 0.33 g of palmitic hydrazide were added. The palmitic hydrazide was first dissolved in 15 ml of ethyl acetate and heated to approximately 50 degrees Centigrade. The solution was added slowly to the hyaluronic acid solution while mechanically mixed with a Silverson L4R mixer at 3500 rpm. The mixer maintained homogeneity within the emulsion while the pH was lowered to 4.55 with 1 M HCl.

While maintaining its pH at around 4.5, a solution of 0.306 g of 1-(3-dimethylaminopropyl)-3-ethylcarbodiimide hydrochloride (EDC), previously dissolved in 10 ml distilled water, was added to the HA/ethyl acetate emulsion. The pH was maintained substantially in a range of about 4.2 to about 4.8 by addition of 1 N HCl. After pH stabilization was observed after approximately 25 minutes, the emulsion, which displayed a cloudy appearance, was neutralized with NaOH, and allowed to cool. The substantially neutral, cooled solution was circulated through a Minitan® filtration system with 300,000 molecular weight cutoff (MWCO) polysulfone membranes to remove unreacted palmitic hydrazide. Approximately 2L of the filtrate were collected. Ninhydrin tests were performed on the retentate, which was found negative for —$NH_2$. The resulting product was lyophilized.

The following example describes the process for preparing a palmitic hydrazide-derivative HA polymer.

EXAMPLE 3

Initially, the process required preparing approximately 500 g of aqueous 0.64% 3.3 kDa hyaluronic acid solution in a tall 1-L beaker and heating the solution to about 65° C. The HA solution is first manufactured in our laboratories by alkaline hydrolysis of 1.3 Mda HA from Optima Chemicals, Inc. The molecular weight of the HA product was determined by viscosity measurements.

At the stated temperature, approximately 0.5884 g of palmitic hydrazide previously dissolved in approximately 10 ml of boiling ethyl acetate were blended with the hyaluronic acid solution. The addition was accomplished while agitating the mixture with a Polytron® mixer to maintain same as an emulsion. The pH of the emulsion formed thereby was thereafter lowered to approximately 4.56 with dropwise addition of 1.1 N HCl. Thereafter, a solution comprising approximately 0.66 g of 1-(3-dimethylaminopropyl)-3-ethylcarbodiimide hydrochloride (EDC) in 10 ml distilled water was added to the emulsion. The pH of the emulsion was maintained within an approximate range of 4.6 to 4.8 by frequent dropwise addition of 1 N HCl until the pH was observed to stabilize. The pH of the stabilized emulsion was then adjusted to about 6.6 with NaOH approximately 50 minutes later.

The reaction mixture was allowed to cool down to room temperature and vacuum filtered over paper. A clear filtrate derived therefrom was added slowly to 1 L of reagent alcohol under magnetic stirring using a Corning stir plate. The precipitated polymer was separated by filtration, redissolved in 200 ml distilled water and lyophilized.

The following example describes the process for preparing a palmitic hydrazide HA-QUAT polymer.

EXAMPLE 4

The first part of the process included preparing approximately 500 g of 0.64% 3.3 kDa HAQuat in solution within a tall 1-L beaker, the HAQuat manufactured in our own laboratory, and heating the solution to about 65° C. At the stated temperature, about 0.58 g of palmitic hydrazide, previously dissolved in 10 ml of hot (60° C.) ethyl acetate, were added to the hyaluronic acid solution while agitating same with a Polytron mixer fitted with a 2" o.d. generator head. The pH of the emulsion thus formed was lowered to 4.56 with 1.1 N HCl, and a solution of about 0.65 g of 1-(3-dimethylaminopropyl)-3-ethylcarbodiimide hydrochloride (EDC) in 10 ml distilled water was added to same. The pH of the emulsion was maintained between 4.6 and 4.8 by frequent dropwise addition of 1 N HCl. Approximately 50 minutes after the pH was observed to be stabilized, the pH was readjusted to approximately 6.6 with NaOH. The emulsion was then allowed to cool down to room temperature and vacuum filtered over paper. A clear filtrate resulted and was added slowly to 1 L of 2-propanol under magnetic stirring. A resulting polymer precipitate was separated by filtration, redissolved in 200 ml distilled water and lyophilized.

The following example describes the process for preparing a palmitic hydrazide HA-QUAT polymer.

EXAMPLE 5

The first step required dissolving approximately 17 g of HAQuat Pilot III in 1 L $H_2O$ in a 4-L beaker. The solution was then heated to 60° C. At the stated temperature, approximately 0.32 g of palmitic hydrazide (TCI, lot F1E01) were dissolved in 10 ml of hot (60° C.) ethyl acetate and blended with the hyaluronic acid solution using a Polytron mixer with a 2" o.d. generator head. The pH of the reaction mixture (emulsion) was lowered to approximately 4.43 with 1.1 N HCl and approximately 0.5 g of solid 1-(3-dimethylaminopropyl)-3-ethylcarbodiimide hydrochloride (EDC) were added to same. The pH of the resulting emulsion was maintained within a range of around 4.4 to 4.8 by frequent dropwise addition of 1 N HCl. Forty five minutes after pH stabilization, the pH was readjusted to approximately 7.8 with NaOH. The reaction mixture was allowed to cool down to room temperature and was vacuum filtered over paper. The clear filtrate was lyophilized to obtain palmitic hydrazide-derivative HAQUAT, as a white solid.

While the process and products herein described constitute preferred embodiments of the invention, it is to be understood that the invention is not limited to these precise processes and products. That is, it should be understood that changes made to the embodiments described herein without departing from the scope of the invention which is limited only by the appended claims.

What is claimed is:

1. A process for derivation a water-soluble polymer, comprising the steps of:

preparing an aqueous solution comprising the water-soluble polymer and one of an activating agent and a derivation agent, wherein the polymer comprises at least one nucleophilic group selected from the group consisting of a carboxyl group and a hydroxyl group, and wherein the activating agent is a carbodiimide and the derivation agent is a hydrazide;

preparing a non-aqueous phase comprising one of said activating agent and said derivation agent such that said derivation agent and said activating agent are in different phases; and mixing said aqueous and non-aqueous phases under conditions of extreme mechanical agitation in order to maintain the non-aqueous phase in an emulsified state within the aqueous polymer solution such that the activating agent activates said polymer and thereby facilitates chemical attachment of the derivation agent such that at least one of polymer activation and derivatization occur at the interface between the bulk aqueous phase and the dispersed non-aqueous phase.

2. The process of claim 1, wherein said activating agent is dicyclohexyl carbodiimide (DCC).

3. The process of claim 2, wherein said activating agent activates nucleophilic groups of said polymer.

4. The process defined by claim 1, wherein said step of mixing under conditions of extreme agitation includes the application of mechanical force by a homogenizer.

5. The process defined by claim 1, wherein said step of mixing under conditions of extreme agitation results in a suspension of derivation agent droplets having an average diameter that is less than one micron.

6. The process of claim 1, wherein said polymer is hyaluronic acid (HA).

7. The process defined by claim 1, wherein said derivation agent is at least one of adipic dihydrazide and palmitic hydrazide.

8. The process defined by claim 1, wherein said step of mixing includes maintaining said emulsion within a pH range of about 4 to about 5 until said process is complete.

9. The process of claim 8, wherein said pH range is maintained by addition of 1N HCl.

10. The process of claim 8, wherein said step of mixing is continued for up to one hour after pH stability is observed.

11. The process of claim 1, wherein said step of preparing includes heating said aqueous solution to within a range of between 40 and 60 degrees centigrade.

12. The process of claim 1, further including a step of purifying said derivative polymer.

13. The process of claim 12, wherein said step of purifying includes continuously circulating said emulsion mixture through a membrane at a pressure of approximately 10 psi.

14. The process of claim 13, wherein said membrane is a 300,000 MWCO polysulfone membrane.

15. The process of claim 1, wherein said polymer is a glycosaminoglycan.

* * * * *